US012712251B2

(12) United States Patent
Powell et al.

(10) Patent No.: US 12,712,251 B2
(45) Date of Patent: Aug. 18, 2026

(54) COMMUNICATION APPARATUS AND COVER THEREOF

(71) Applicant: BCE Inc., Verdun (CA)

(72) Inventors: Mike Powell, Verdun (CA); Kyle Furlong, Verdun (CA); Eric Guimond, Verdun (CA); Peter Di Grado, Verdun (CA)

(73) Assignee: BCE INC., Verdun (CA)

( * ) Notice: Subject to any disclaimer, the term of this patent is extended or adjusted under 35 U.S.C. 154(b) by 209 days.

(21) Appl. No.: 18/565,597

(22) PCT Filed: Jun. 3, 2022

(86) PCT No.: PCT/CA2022/050893
§ 371 (c)(1),
(2) Date: Nov. 30, 2023

(87) PCT Pub. No.: WO2022/251972
PCT Pub. Date: Dec. 8, 2022

(65) Prior Publication Data

US 2024/0258678 A1 Aug. 1, 2024

Related U.S. Application Data

(60) Provisional application No. 63/196,490, filed on Jun. 3, 2021.

(51) Int. Cl.
*H01Q 1/12* (2006.01)
*H01Q 1/02* (2006.01)
*H01Q 1/42* (2006.01)

(52) U.S. Cl.
CPC ............ *H01Q 1/1242* (2013.01); *H01Q 1/02* (2013.01); *H01Q 1/428* (2013.01)

(58) Field of Classification Search
CPC .......... H01Q 1/005; H01Q 1/02; H01Q 1/12; H01Q 1/1207; H01Q 1/1228; H01Q 1/1242; H01Q 1/08; H01Q 1/10; H01Q 1/103; H01Q 1/106; H01Q 1/18; H01Q 1/246; H01Q 1/42; H01Q 1/428; H01Q 1/44
See application file for complete search history.

(56) References Cited

U.S. PATENT DOCUMENTS

| | | | | | |
|---|---|---|---|---|---|
| 2014/0318007 | A1* | 10/2014 | Hogan | A47G 7/044 119/51.01 |
| 2017/0238432 | A1* | 8/2017 | Lapham | H02S 99/00 362/225 |
| 2020/0350686 | A1 | 11/2020 | Nemeth, III | |

OTHER PUBLICATIONS

International Search Report for International Application No. PCT/CA2022/050893 dated Sep. 7, 2022.

* cited by examiner

*Primary Examiner* — Robert Karacsony

(57) ABSTRACT

A communication apparatus and a cover for the communication apparatus are provided. The communication apparatus comprises a pole, an antenna connected to the pole, network equipment connected to the pole, lowering mechanism positioned within the pole, and a cover coupled to the lowering mechanism. The cover covering the antenna and network equipment when in a closed position. The cover for the communication apparatus comprises a first end and a second end, the first end being moveably coupled to the communication apparatus, and at least one elongated member extending from the first end to the second end, the at least one elongated member being shaped with ridges or dimples. The cover covering the equipment of the communication apparatus.

13 Claims, 8 Drawing Sheets

COMMUNICATION APPARATUS AND COVER THEREOF

CROSS-REFERENCE TO RELATED APPLICATIONS

The present application claims priority to U.S. Provisional Patent Application No. 63/196,490 filed Jun. 3, 2021, the entire contents of which is incorporated herein by reference for all purposes.

TECHNICAL FIELD

The present disclosure relates to a communication apparatus, and in particular to a communication pole and assembly that allows for heat dissipation and prevents vortex shedding.

BACKGROUND

Communication apparatuses or poles are used to provide various communication services, such as mobility services. The communication apparatuses or poles may have a plurality of different communication and network equipment to provide the services, and other equipment to provide power to the communication apparatus or pole. The various equipment and elements of communication apparatuses or poles are not always visually appealing and may generate heat while in use. This prevents communication apparatuses or poles from being set up in some locations. Some communication apparatuses or poles may have covers or doors to hide the various equipment, however these doors or covers may cause the equipment to overheat, and not provide good air flow.

The communication apparatuses or poles can also be tall in size and can be complex or difficult to assemble. This prevents the poles from easily being transported or set up in new locations to provide more mobility services. In addition, when the communication apparatuses or poles are subject to wind or other weather conditions, the cover and height may subject the communication apparatus or pole to vortex shedding and cause the pole to rock back and forth.

Accordingly, an additional, alternative, and/or improved communication apparatus or pole is desired.

SUMMARY

In accordance with one aspect of the present disclosure, a cover for a communication apparatus is disclosed, the cover comprising a first end and a second end, wherein the cover is moveably coupled to the communication apparatus at the first end; and at least one elongated member attached to the first end and the second end, and extending between the first end and the second end such that the at least one elongated member covers equipment of the communication apparatus, the at least one elongated member being shaped with ridges or dimples.

In the cover, the at least one elongated member may further comprise at least one opening.

The cover may comprise two or more elongated members attached to the first end and the second end, and extending between the first end and the second end.

In the cover, the two or more elongated members may be separated by an opening between each elongated member.

In the cover, the two or more elongated members may each have the same shape and be attached to the first end and the second end in an alternating configuration.

In the cover, the first end and the second end may be rings that surround the communication apparatus.

The cover may be moveable from an open position to a closed position, wherein in the open position, the equipment of the communication apparatus is accessible.

In the open position, the cover may be held open via a lock mechanism.

The cover may be moveably coupled to the communication apparatus via cables attached to the cover and coupled to the communication apparatus.

The cover may further comprise wheels on an inside surface of the cover.

In accordance with another aspect of the present disclosure, a communication apparatus is disclosed, the communication apparatus comprising a pole, an antenna and network equipment mounted to the pole, a lowering mechanism positioned within the pole, and a cover for covering the antenna and the network equipment, the cover coupled to the lowering mechanism and configured to move between an open position and a closed position.

In the communication apparatus, the cover may be coupled to the lowering mechanism via a cable system.

In the communication apparatus, the cable system may comprise at least one cable having a first end connected to the cover and a second end connected to the lowering mechanism, and at least one pulley, the at least one pulley coupled to the pole such that the at least one cable passes over the at least one pulley between the lowering mechanism and the cover.

In the communication apparatus, in the open position, the antenna and the network equipment are accessible and in the closed position, the antenna and the network equipment are covered.

In the communication apparatus, in the open position, the cover may be held open via a lock mechanism.

The communication apparatus may further comprise bumpers positioned along the pole to guide the movement of the cover.

In the communication apparatus, the cover comprises at least one elongated member attached to and extending between a first end of the cover and a second end of the cover.

In the communication apparatus, the at least one elongated member may be shaped with ridges or dimples.

In the communication apparatus, the at least one elongated member may comprise at least one opening.

In the communication apparatus, the cover may comprise two or more elongated members, the two or more elongated members being separated by an opening between each elongated member.

In the communication apparatus, the first end and the second end of the cover are rings that surround the communication apparatus, wherein the two or more elongated members may each have the same shape and be attached to the first end and the second end of the cover in an alternating configuration.

BRIEF DESCRIPTION OF FIGURES

Further features and advantages of the present disclosure will become apparent from the following detailed description, taken in combination with the appended drawings, in which.

DETAILED DESCRIPTION

A cover for a communication apparatus and the communication apparatus are disclosed herein. The cover for the communication apparatus covers equipment of the communication apparatus. The cover comprises a first end and a second end, and at least one elongated member extending from the first end to the second end. The at least one elongated member is shaped with ridges or dimples, and the first end of the cover is moveably coupled to the communication apparatus. The communication apparatus comprises a pole, an antenna connected to the pole, network equipment connected to the pole, a counterweight positioned within the pole, and a cover coupled to the counterweight. The cover is positioned to cover the antenna and network equipment when in a closed position.

Figure 1:
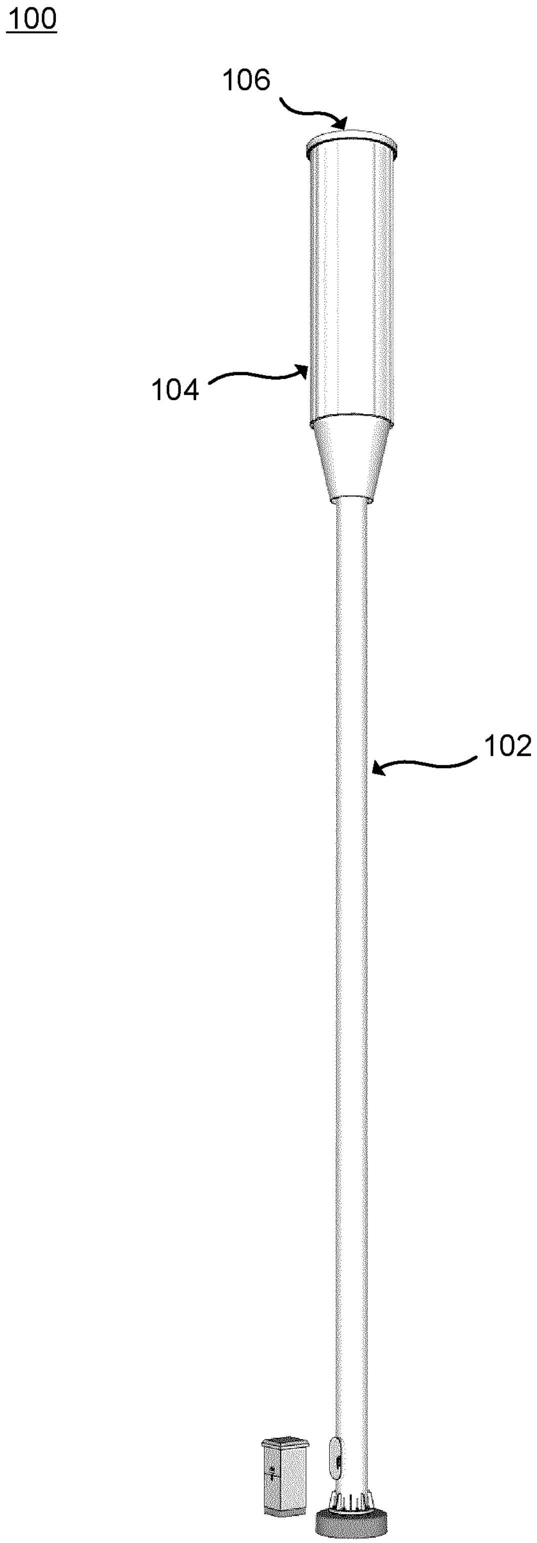
FIG. 1 depicts an embodiment of the communication pole.

FIG. 1 depicts an embodiment of the communication apparatus or pole 100 of the present invention. The communication apparatus or pole 100 comprises a pole 102, and a cover, shroud, or sheath 104. The pole 102 may be secured to the ground using fasteners and other pole securing means, and the cover 104 covers and protects the network and communication equipment of the communication pole 100. The communication pole 100 may comprise a top cap 106 that is placed on the pole 102 and cover 104 to further cover and protect the network and communication equipment. The network and communication equipment of the communication pole 100 is secured to the pole 102 so that it may be covered by the cover 104. As depicted in FIG. 1, there may be a wire line router and a power pedestal at a bottom of the communication pole 100.

Figure 2:
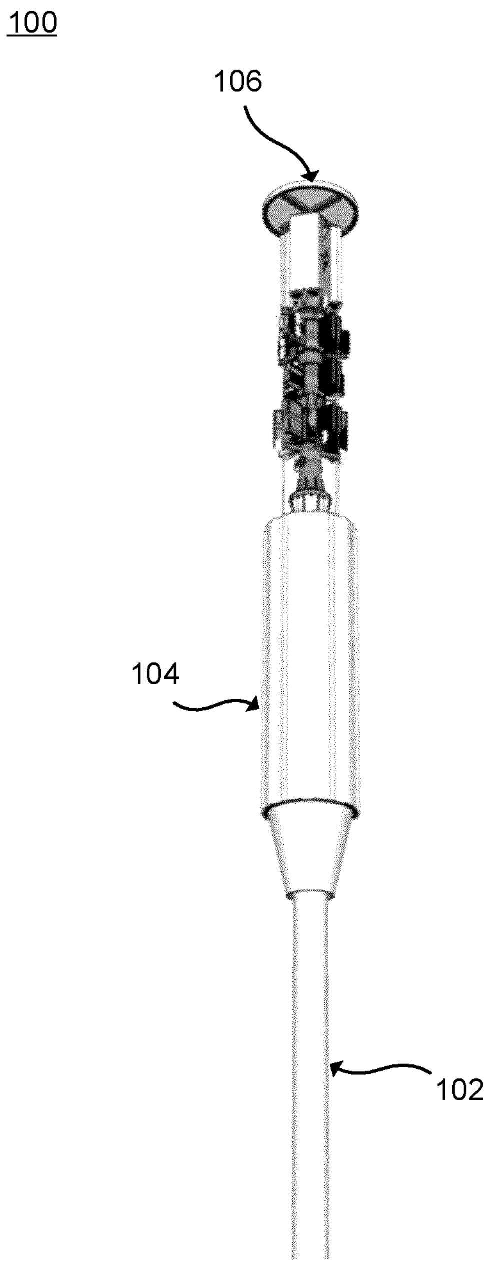
FIG. 2 depicts a cover of the communication pole in an open position.

In FIG. 1, the cover 104 is positioned in a closed position covering the network and communication equipment. FIG. 2 depicts an embodiment of the cover 104 in an open position, where the network and communication equipment is visible and accessible. The cover 104 is moveable from the closed position, depicted in FIG. 1, to the open position, depicted in FIG. 2, as described below. The cover 104 may be moved from the closed position to the open position for set up of the communication pole 100 and for any maintenance or other work to be done on the equipment of the communication pole 100.

Figure 3A:
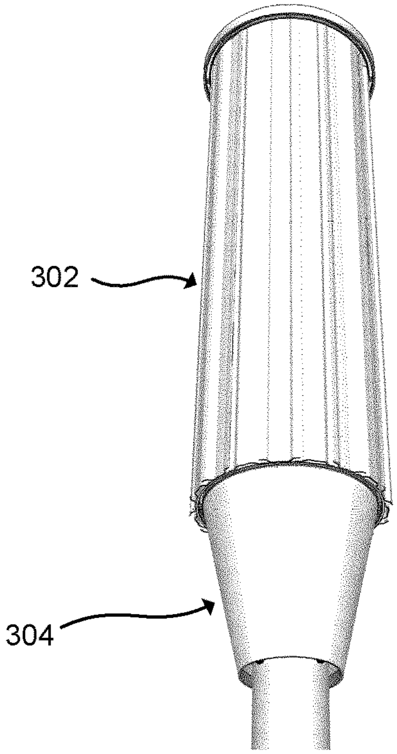
FIGS. 3A-3C depict an embodiment of the cover of the communication pole.
Figure 3B:
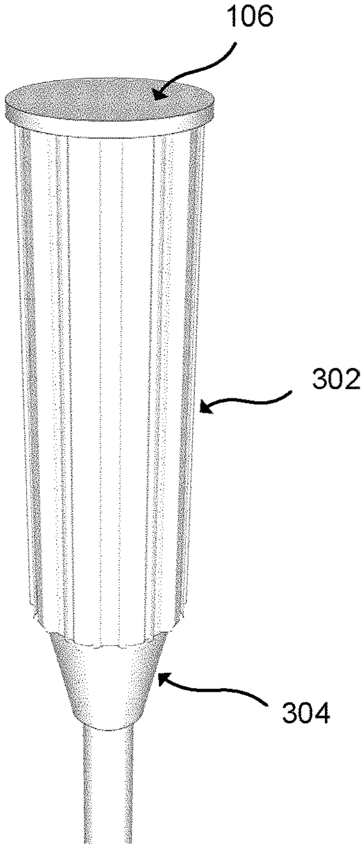
Figure 3C:
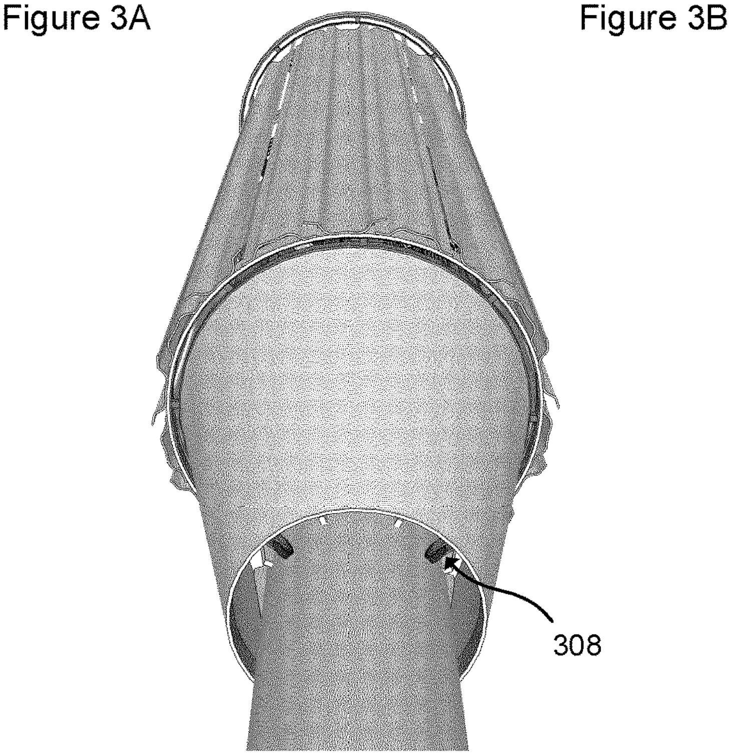

FIGS. 3A-3C depict an embodiment of the cover 104 of the communication pole 100. The cover 104 may have a round shape that wraps around and covers the equipment on the communication pole 100. It will be appreciated that the shape of the cover 104 may instead be a triangular, rectangular, or other polygonal shape that covers the equipment of the communication pole 104. The cover 104 comprises a main body 302 and a cone 304 at a bottom of the main body 302. The cone 304 may be formed as part of the main body 304, or as depicted, the cone 302 may be formed separately and connected to the main body 302. In some embodiments, the cone 304 may be removably connected to the main body 302.

Figure 4A:
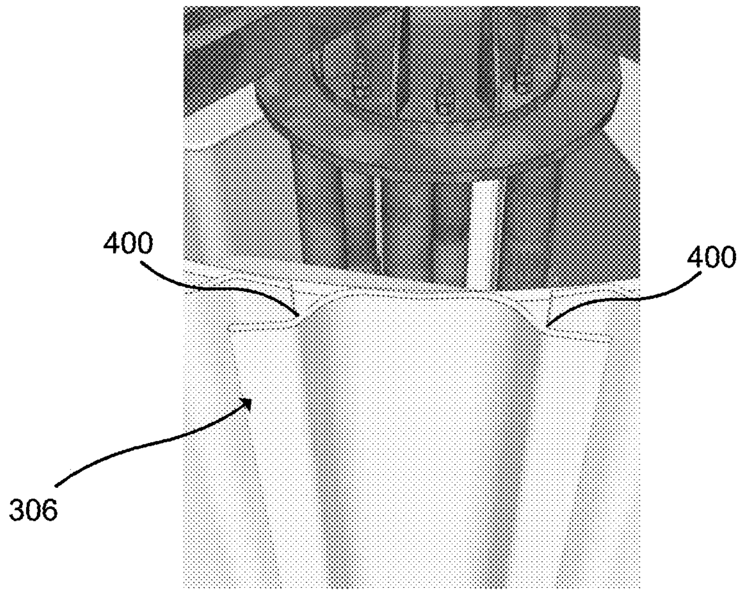
FIGS. 4A and 4B depict an embodiment of elongated members or slats of the cover.
Figure 4B:
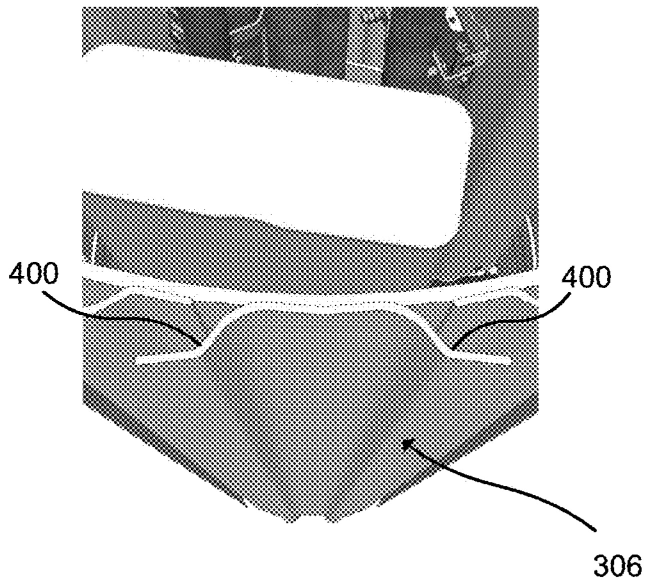
Figure 8:
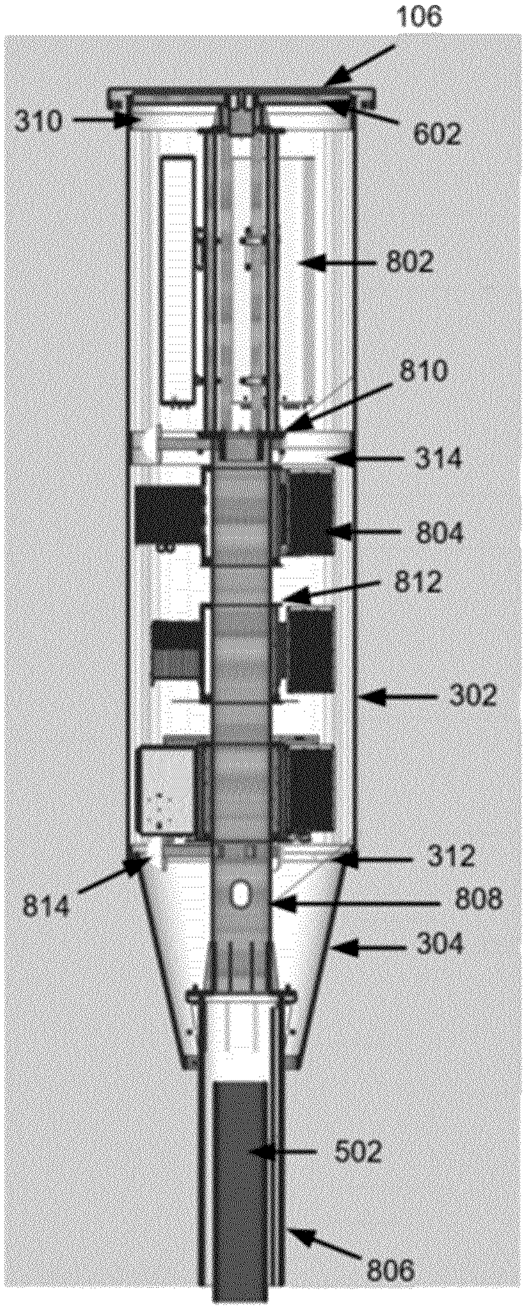
FIG. 8 depicts a cross sectional view of the communication pole.

The main body 302 comprises at least two rings 310, 312 (shown in FIG. 8). The first ring 310 being at a first or top end of the main body 302, and the second ring 312 being at a second or bottom end of the main body 302 and connecting the cone 304 to the main body 302. The main body 302 may further comprise other rings 314 (shown in FIG. 8) spaced along the length of the main body 302. A plurality of elongated members or slats 306 extend between the first ring 310 and the second ring 312 and are secured to the first and second rings 310, 312. The slats 306 may also secure to the additional rings 314. The slats 306 are shaped with ridges 400 or dimples and may have a wavy or u type shape as depicted in FIGS. 4A and 4B. The wavy or u type shape shown in the figures is formed along the full length of each slat 306 and may be the same for each slat 306. Each of the slats 306 may be formed in this same shape for ease of manufacturing and ease of set-up of the communication pole 100. It will be appreciated that in some embodiments, each slat 306 may be formed of a different shape with different dimple or ridge patterns. Each slat 306 may also or instead have holes on its surface.

When the communication pole 100 is secured to the ground and in use, the communication pole 100 may be subject to wind, rain, snow, and other weather conditions. As described above, when communication poles or other poles or towers are subject to wind, the pole or tower may start to rock back and forth or start to lean in one direction. This may be caused by smooth surfaces on the pole or tower that create vortex shedding. The slats 306 of the present communication pole 100 are formed with dimples or ridges, or in the wavy or u type shape, to prevent any rocking of the pole or any vortex shedding.

It will be appreciated that although the main body 302 of the cover 104 is described and depicted as having a plurality of vertically affixed slats 306, the main body 302 may instead have one or more slats, formed with dimples or ridges, that may be vertically or horizontally affixed. Further, in some embodiments the main body 302 may be formed as one piece having dimples and ridges.

The slats 306 securely attach to the rings 310, 312 of the main body 302. Each slat 306 attaches to the first or top ring 310 at a first end of the slat 306, and to the second or bottom ring 312 at an opposite end of the slat 306. Each slat 306 may securely attach to each ring 310, 312 in the same manner, with the same surface facing inward of the cover 104, or as depicted, the slats 306 may attach to the rings 310, 312 in an alternating configuration. For example, an inner surface of a first slat 306 is secured to each ring 310, 312, and an outer or opposite surface of the next slat 306 is secured to the rings 310, 312. This pattern may repeat for all of the slats 306 around the rings 310, 312 of the main body 302. It will be appreciated that the alternating pattern may repeat for only a portion of the circumference of the rings 310, 312, or a different configuration of the slats 306 may be used around the rings 310, 312 or around only a portion of the circumference of the rings 310, 312.

The rings 310, 312, 314 may be fiberglass rings that the slats 306 are securely attached to, to provide good rigidity of the cover 104. In some embodiments, the slats 306 may be removably attached to the rings 310, 312, so that they may be removed or replaced for safety or maintenance.

As further depicted in FIGS. 3A-3C and 4A-4B, the slats 306 may be attached to the rings 310, 312 such that there are openings between each of the slats 306. In the figures, the slats 306 are attached in an alternating configuration and spaced apart so that the shape of the slats 306 provide an opening in the cover 104. The openings between the slats 306 may be positioned in such a way that allows the communication and network equipment to not be visible from the outside of the communication pole 100. As depicted, the openings are positioned perpendicular to the surface of the rings 310, 312. These openings allow for the cover 104 to appear as a solid piece, and allow for heat dissipation of the equipment on the communication pole 100 while the communication pole 100 is in use.

It will be appreciated that although the openings are depicted and described as being between the slats 306, the openings may also or instead be present on the surface of the slats 306. In some embodiments, the slats 306 may be formed with dimples or ridges and/or with openings. The openings may be formed in a manner where the equipment under the cover 104 may be seen from the outside, or to be more visually pleasing, the openings may be formed such that they provide a means for heat dissipation and do not allow the equipment of the communication pole 100 to be seen.

It will be appreciated that the cone 304 may be shaped with an opening or with space between the cone and the pole 102. This allows for air flow up through the cone 304 to cool to network and communication equipment.

As described above, the cover 104 is configured to be moved between the open and the closed positions. The movement of the cover 104 may be done by a maintenance or other worker manually by physically moving the cover 104 upwards and downwards. In some embodiments, the movement of the cover 104 may be automated such that, when activated, the cover 104 is automatically moved into the open and closed positions. To guide the movement of the cover 104, the cover 104 may further comprise wheels 308 or another bearing type means that engage with the pole 102. The wheels 308 may be connected to the cone 304 of the cover 104, or in some embodiments the wheels 308 may be connected to the pole 102 and engage with the cover 104.

Figure 5:
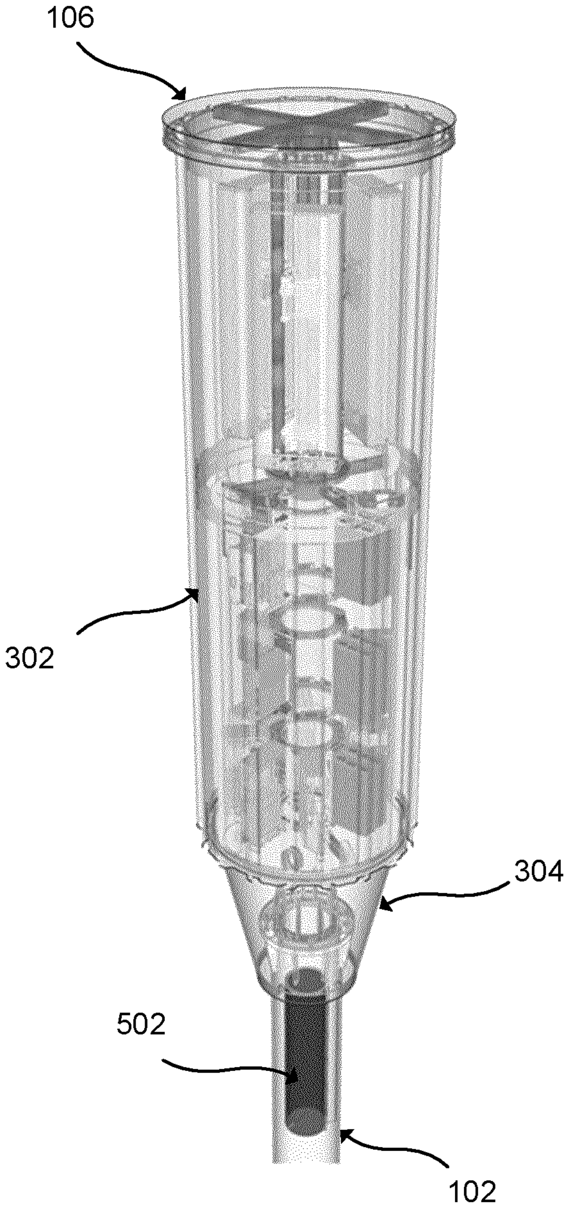
FIG. 5 depicts an embodiment of a counter weight system of the communication pole.

FIG. 5 depicts an embodiment of a counter weight system or lowering mechanism of the communication pole 100. The counter weight system allows for the movement of the cover 104 from the closed position to the open position, and vice versa. In FIG. 5, the cover 104, the top cap 106, and the pole 102 are depicted with transparent surfaces. The counter weight system comprises a counter weight 502 which may be made of lead, cement, or another material, and connects to the cover 104 via cables 504 (depicted in FIG. 7B). The counter weight 502 is placed inside the pole 102 and moves within the pole 102 when the cover 104 is moved between the open and closed positions. The material and weight of the counter weight 502 may be selected such that the cover 104 can be moved by a maintenance or other worker without undue stress or strain.

The cables 504 connect to the counter weight 502 and to the cover 104. The cables 504 may directly connect to the counter weight 502 or may be formed into the counter weight 502, and the opposite end of the cables 504 may directly connect to the cover 104 at the main body 302. The cables 504 may directly connect or be fastened to any of the rings of the main body 302. The cables 504 may be long cables that provide good strength and do not stretch. There may be two or more cables 504 connecting the counter weight 502 to the cover 104. The cables 504 securely connect to the cover 104 such that each cable 504 is evenly spaced apart around the main body 302 of the cover 104. It will be appreciated that although depicted as being evenly spaced apart, some of the cables 504 may instead be spaced further or closer to each other.

Figure 6A:
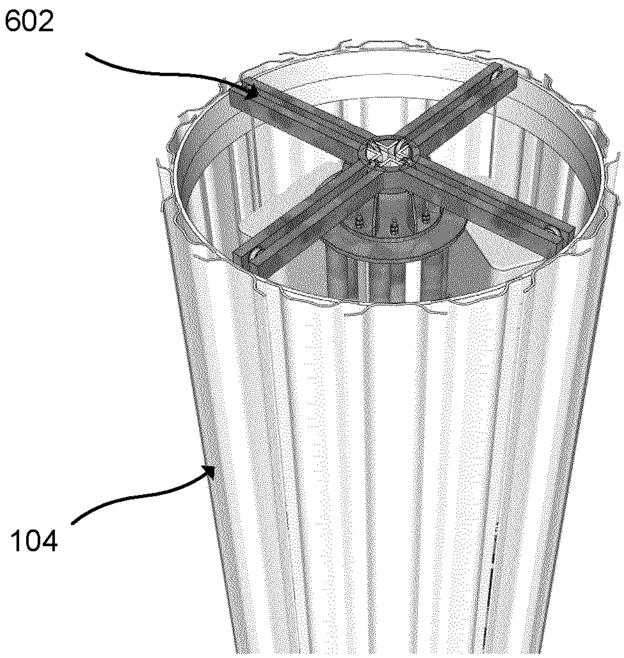
FIGS. 6A and 6B depict an embodiment of a pulley system of the communication pole.
Figure 6B:
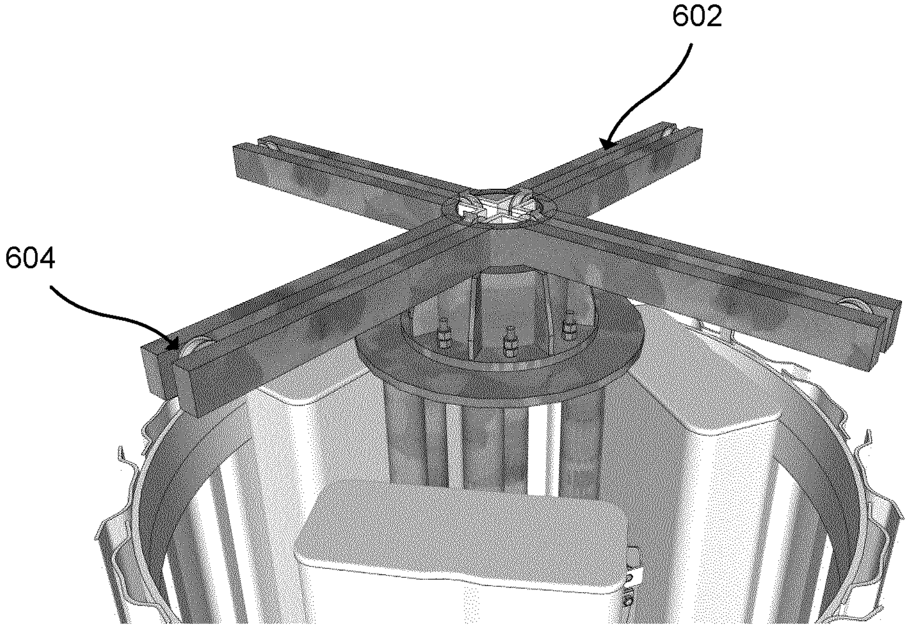

FIGS. 6A and 6B depict an embodiment of a pulley system of the communication pole 100. The pulley system may be formed as part of the pole 102 or may be formed separately and securely attached to the pole 102. The pulley system may be positioned at a top, bottom or middle of the pole 102. As depicted in FIGS. 6A and 6B, the pulley system may be positioned at a top of the pole 102 and may be covered by the top cap 106. As depicted, the pulley system comprises four members or arms 602 extending out from a centre of the pulley system. The arms 602 may be connected together or formed together at the pole 102 or may be each separate arms 602 connected to the pole 102. The arms 602 extend out to a length that allows the cover 104 to move over or past the arms 602 without coming into contact with arms 602. The members or arms 602 are shaped and configured so that each cable 504 passes through one arm 602. Therefore, as depicted in FIGS. 6A and 6B, there are four cables 504 that would each pass through one of the four arms 602. Although four members or arms 602 and four cables 504 are depicted, it will be appreciated that there may be two or more arms 602 and cables 504.

Each member or arm 602 may be shaped with an opening that extends the length of the arm 602 to allow the cable 504 to pass through from the centre of the pole 102. The cables 504 pass through the pole 102, to the arm 602, and over a pulley 604 that is connected to an end of the arm 602 away from the centre of the pole 102. The pulley 604 may be connected within the opening of the arm 602 such that the pulley 504 does not contact the top cap 106 or the cover 104.

The cables 504 connected to the counter weight 502 pass through the pole 102 and through the centre of the arms 602. Each cable 504 then passes through the opening of an arm 602, around the pulley 604 connected to the arm, and connects to the cover 104. The pulleys 604 facilitate the movement of the cover 104 and counter weight 502 between the open and closed positions. The pulleys 604 are positioned so that the pulleys 604 and the cables 504 do not contact the top cap 106 during rotation.

It will be appreciated that there may be an addition cable at a bottom of the counter weight 502. The additional cable can allow another user to assist in the lifting and/or lowering of the cover 104. In some embodiments, there may be an additional pulley or a winch for the additional cable near the bottom of the counter weight 502 or the pole 102.

Figure 7B:
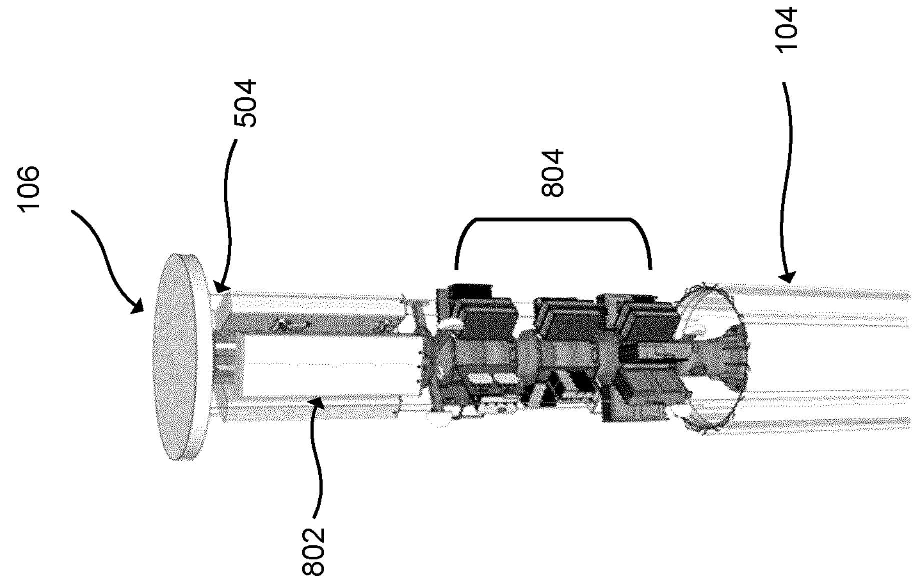
FIGS. 7A and 7B further depict the cover in the open position.
Figure 7A:
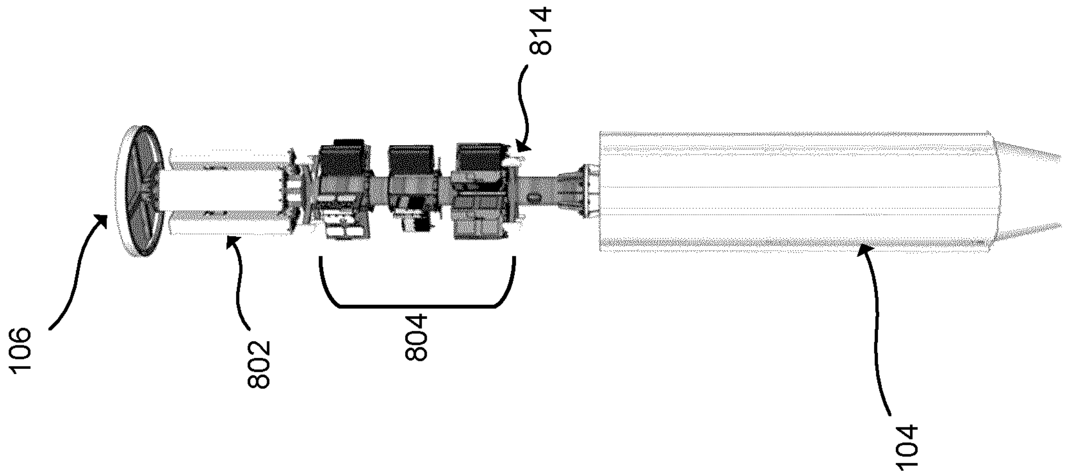

FIGS. 7A and 7B further depict the cover 104 in the open position. When the cover 104 is manually or automatically moved into the open position, the counter weight 502 is displaced in the pole 102. The cover 104 may then be locked or held into the open position by a locking mechanism. The locking mechanism may be positioned on the cover 104 and/or on the pole 102 to hold the cover 104 in the open position. The communication pole 100 may further comprise a second locking mechanism or may use the same locking mechanism to hold the cover 104 in the closed position. As depicted in FIGS. 7A and 7B, the cover 104 may be moved to allow all of the network and communication equipment to be accessed. In some embodiments, the cover 104 may be moved and locked into a position to allow only some of the network and communication equipment to be accessed. It will be appreciated that there may be a further locking mechanism to hold the counter weight 502 in position when the cover 104 is open or closed.

FIG. 8 depicts a cross sectional view of the communication pole 100. The communication pole 100 comprises antennas 802 and wireless RAN (radio access network)

equipment 804 that is covered by the cover 104 when in the closed position. The antennas 802 and wireless RAN equipment 804 are connected to the pole 102 so that all of the equipment may be covered and in one location on the communication pole 100. This allows for all of the devices and equipment for the communication pole 100 to be easily accessed when the cover 104 is moved to the open position. As depicted in FIG. 1, the power pedestal for the communication pole 100 may be on the ground proximal to the pole 102 to provide power to the communication pole 100.

The pole 102 may be secured to the ground via a foundation as depicted in FIG. 1. The pole 102 may be secured or bolted to a cement foundation in the ground. It will be appreciated that, in some embodiments, the pole 102 may instead be directly buried into the ground. By directly burying the pole 102 in the ground, the bending stress at a base of the pole 102 may be reduced.

The pole 102 may be one solid pole that secures to a foundation or is directly buried into the ground, or may be formed of two or more elements. In embodiments where the pole 102 is formed of two or more elements, the pole 102 may comprise a monopole 806, an internal modular mast 808, and an upper antenna spindle 810. The monopole 806 may secure to the ground when the communication pole 100 is set up, the internal modular mast 808 connects or fastens to the monopole 806, and the upper antenna spindle 810 connects or fastens to the internal modular mast 808. The multiple elements of the pole 102 allow for a modular pole that may be standardized, transported, and set up easily.

The wireless RAN equipment 804 may attach to the internal modular mast 808 via mounting plates 812. There may be one or more mounting plates 812 spaced along the mast 808 for the wireless RAN equipment 804. The antennas 802 are mounted to the antenna spindle 810 which is positioned above the internal modular mast 808. The communication pole 100 may further comprise bumpers 814 spaced along the mast 808. The bumpers 814 along with the wheels 308 connected to the cover 104, may guide the cover 104 during movement of the cover 104 between the open and closed positions. This allows for the cover 104 to be displaced without hitting or coming in contact with the antennas 802 and wireless RAN equipment 804.

The communication pole 100 comprising the cover 104 that has dimples or ridges, and may further have openings, allows the antennas 502 and wireless RAN equipment 504 to be covered and protected. It also reduces or mitigates the impacts of any vortex shedding on the pole, and allows the heat to dissipate from the equipment. The antennas and wireless RAN equipment may also be cooled with air flow from the openings between the slats 306 and the opening at the cone 304.

The cover 104 comprising ridges or dimples and openings, while appearing as a solid piece, may facilitate site acceptance, so that more communication poles 100 may be placed in for example parking lots or other similar areas. The communication pole 100 may further comprise lights on the cover 104 or pole 102 to act as a lamp post.

It will be appreciated that communication poles are not always aesthetically pleasing for people walking, driving or sitting nearby, and are therefore not permitted in many locations in various cities. Because the communication pole 100 appears as a solid piece and covers the various equipment, the communication pole 100 is much more appealing for people walking, driving or sitting nearby. This allows the communication pole 100 to be accepted at many different sites and locations as it is aesthetically pleasing and may further act as a lamp post in some embodiments.

It will be apparent to persons skilled in the art that a number of variations and modifications can be made without departing from the scope of the invention. Although specific embodiments are described herein, it will be appreciated that modifications may be made to the embodiments without departing from the scope of the current teachings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A cover for a communication apparatus, the cover comprising:

a body comprising a first end and a second end, wherein when the cover is coupled to a communication apparatus, the cover is configured to move from an open position to a closed position;

two or more elongated members each attached to the first end and the second end, and each extending between the first end and the second end such that the two or more elongated members cover equipment of the communication apparatus when the cover is in the closed position, each of the two or more elongated members being shaped with ridges;

wherein the two or more elongated members are separated by an opening between each elongated member; and wherein the two or more elongated members each have the same shape and are attached to the first end and the second end in an alternating configuration.

2. The cover of claim 1, wherein the body comprises a first ring located at the first end and a second ring located at the second end, wherein the two or more elongated members are attached to and extend between the first ring and the second ring.

3. The cover of claim 1, wherein in the open position, the equipment of the communication apparatus is accessible.

4. The cover of claim 3, wherein in the open position, the cover is configured to be held open via a lock mechanism.

5. The cover of claim 1, wherein the cover is configured to move from an open position to a closed position via cables attached to the cover and-couplable to the communication apparatus.

6. The cover of claim 1, further comprising wheels on an inside surface of the cover.

7. A communication apparatus comprising:

a pole;

an antenna and network equipment mounted to the pole;

a lowering mechanism positioned within the pole; and a cover for covering the antenna and the network equipment, the cover coupled to the lowering mechanism and configured to move between an open position and a closed position, wherein the cover comprises a body comprising a first end and a second end; and two or more elongated members each attached to and extending between the first end of the cover and the second end of the cover such that the two or more elongated members cover the antenna and the network equipment when the cover is in the closed position, each of the two or more elongated members being shaped with ridges;

wherein the two or more elongated members are separated by an opening between each elongated member; and wherein the two or more elongated members each have the same shape and are attached to the first end and the second end of the cover in an alternating configuration.

8. The communication apparatus of claim 7, wherein the cover is coupled to the lowering mechanism via a cable system.

9. The communication apparatus of claim 8, wherein the cable system comprises:

at least one cable having a first end connected to the cover and a second end connected to the lowering mechanism; and at least one pulley, the at least one pulley coupled to the pole such that the at least one cable passes over the at least one pulley between the lowering mechanism and the cover.

10. The communication apparatus of claim 7, wherein in the open position, the antenna and the network equipment are accessible and in the closed position, the antenna and the network equipment are covered.

11. The communication apparatus of claim 10, wherein in the open position, the cover is held open via a lock mechanism.

12. The communication apparatus of claim 10, further comprising bumpers positioned along the pole to guide the movement of the cover.

13. The communication apparatus of claim 7, wherein the body comprises a first ring located at the first end and a second ring located at the second end, wherein the two or more elongated members are attached to and extend between the first ring and the second ring.

* * * * *